United States Patent
Nakayama

(10) Patent No.: US 7,680,135 B2
(45) Date of Patent: Mar. 16, 2010

(54) AUDIO NETWORK SYSTEM HAVING LAG CORRECTION FUNCTION OF AUDIO SAMPLES

(75) Inventor: Kei Nakayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 311 days.

(21) Appl. No.: 11/729,325

(22) Filed: Mar. 27, 2007

(65) Prior Publication Data

US 2007/0230494 A1 Oct. 4, 2007

(30) Foreign Application Priority Data

Mar. 28, 2006 (JP) ............................ 2006-089508
Mar. 28, 2006 (JP) ............................ 2006-089509

(51) Int. Cl.
*H04L 12/28* (2006.01)
*H04L 12/403* (2006.01)
*G06F 15/16* (2006.01)

(52) U.S. Cl. ...................... 370/403; 370/452; 709/208; 709/251

(58) Field of Classification Search ................ 370/412, 370/428, 429, 403, 452; 709/208, 251
See application file for complete search history.

(56) References Cited

U.S. PATENT DOCUMENTS

| | | | |
|---|---|---|---|
| 6,253,303 B1 * | 6/2001 | Shibuya | 711/217 |
| 6,504,823 B1 * | 1/2003 | Nakajima et al. | 370/241 |
| 2004/0233852 A1 * | 11/2004 | Ochi et al. | 370/242 |
| 2005/0114116 A1 * | 5/2005 | Fiedler | 704/201 |
| 2005/0152692 A1 * | 7/2005 | Norizuki et al. | 398/12 |
| 2005/0288805 A1 * | 12/2005 | Moore et al. | 700/94 |
| 2006/0105703 A1 * | 5/2006 | Takizawa et al. | 455/3.01 |

(Continued)

FOREIGN PATENT DOCUMENTS

| | | |
|---|---|---|
| JP | 04-286436 A | 10/1992 |
| JP | 05-347628 A | 12/1993 |
| JP | 2002-247059 A | 8/2002 |

OTHER PUBLICATIONS

The CobraNet, URL—http://www.balcom.co.jp/cobranet.htm.

(Continued)

*Primary Examiner*—Alpus H Hsu
*Assistant Examiner*—Saad Hassan
(74) *Attorney, Agent, or Firm*—Morrison & Foerster LLP

(57) ABSTRACT

In an audio network system connecting a plurality of nodes in a ring form, a master node transmits a packet of frame data regularly every sampling cycle, such that the packet circulates through the nodes during the sampling cycle. The packet is provided with a plurality of regions for containing audio sample data in correspondence to a plurality of channels. A first node reads audio sample data from a particular region of the packet, which corresponds to a particular channel allocated to the first node, and stores the read audio sample data in a buffer. The first node acquires positional information indicating whether a second node which has written the audio sample data into the particular region is located upstream or downstream of the first node. The first node reads and outputs a previous one of the audio sample data from the buffer if the second node is located upstream of the first node, and outputs a current one of the audio sample data if the second node is located downstream of the first node.

14 Claims, 13 Drawing Sheets

U.S. PATENT DOCUMENTS

2007/0189411 A1* 8/2007 Goss .......................... 375/272
2007/0195101 A1* 8/2007 Senior et al. ................ 345/545

OTHER PUBLICATIONS

Digital Audio Interconnection, Oxford Technologies, URL:—http://www.sonyoxford.co.uk/pub/supermac/.

EtherSound: ethernetworking professional audio, URL:—http://ethersound.com/news/getnews.php?enews-key=101.

Notice of Reason for Rejection mailed Mar. 19, 2009, for JP Patent Application No. 2006-089508, with English Translation, six pages.

Notice of Reason for Rejection mailed Mar. 19, 2009, for JP Patent Application No. 2006-089509, with English Translation, six pages.

* cited by examiner

Total Delay = t (2a+2b)
Forward Delay = t (2a+2b)
Backward Delay = t (0)

Total Delay = t (2a+2b)
Forward Delay = t (2b)
Backward Delay = t (2a)

Total Delay = t (2a+2b)
Forward Delay = t (0)
Backward Delay = t (2a+2b)

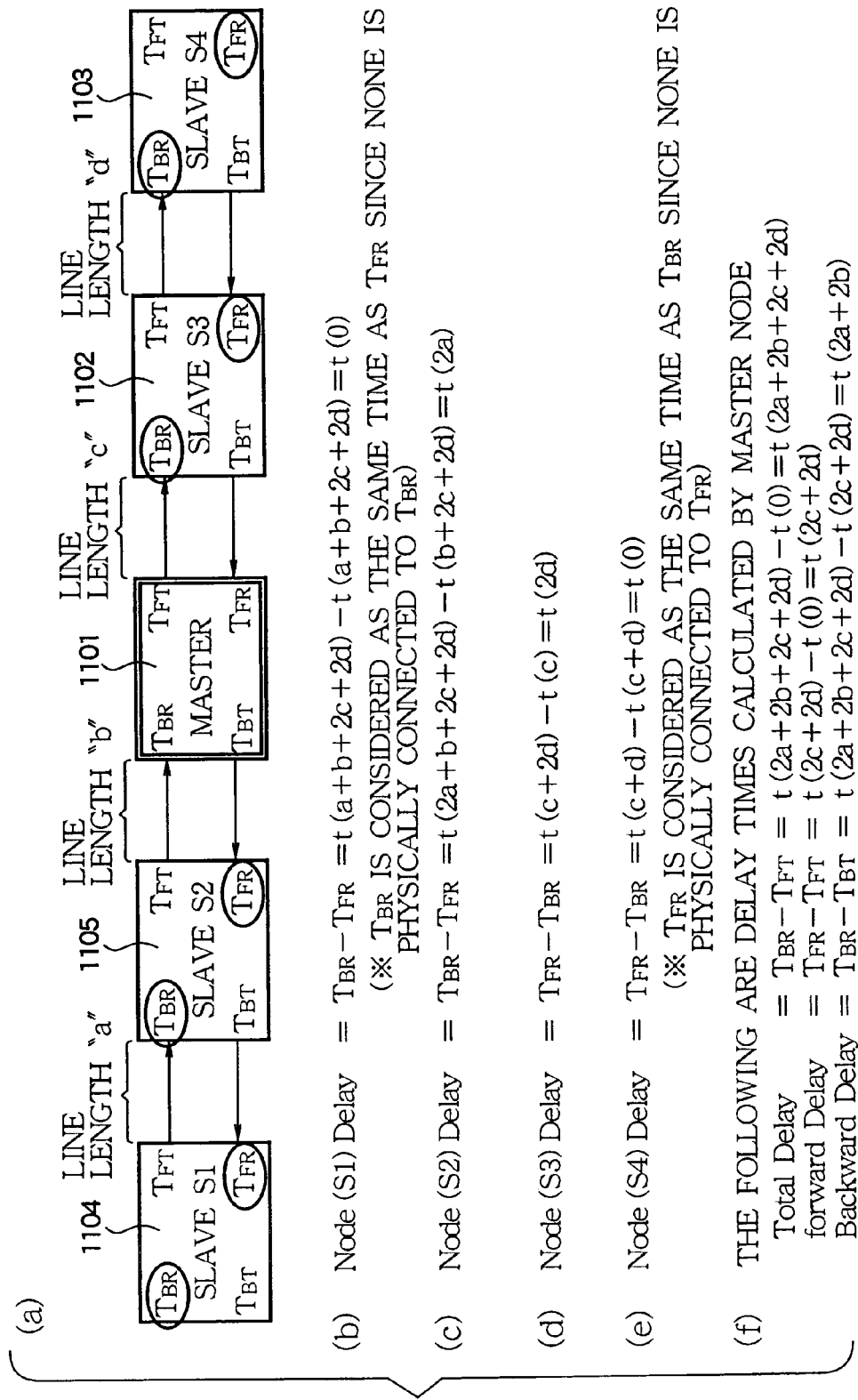

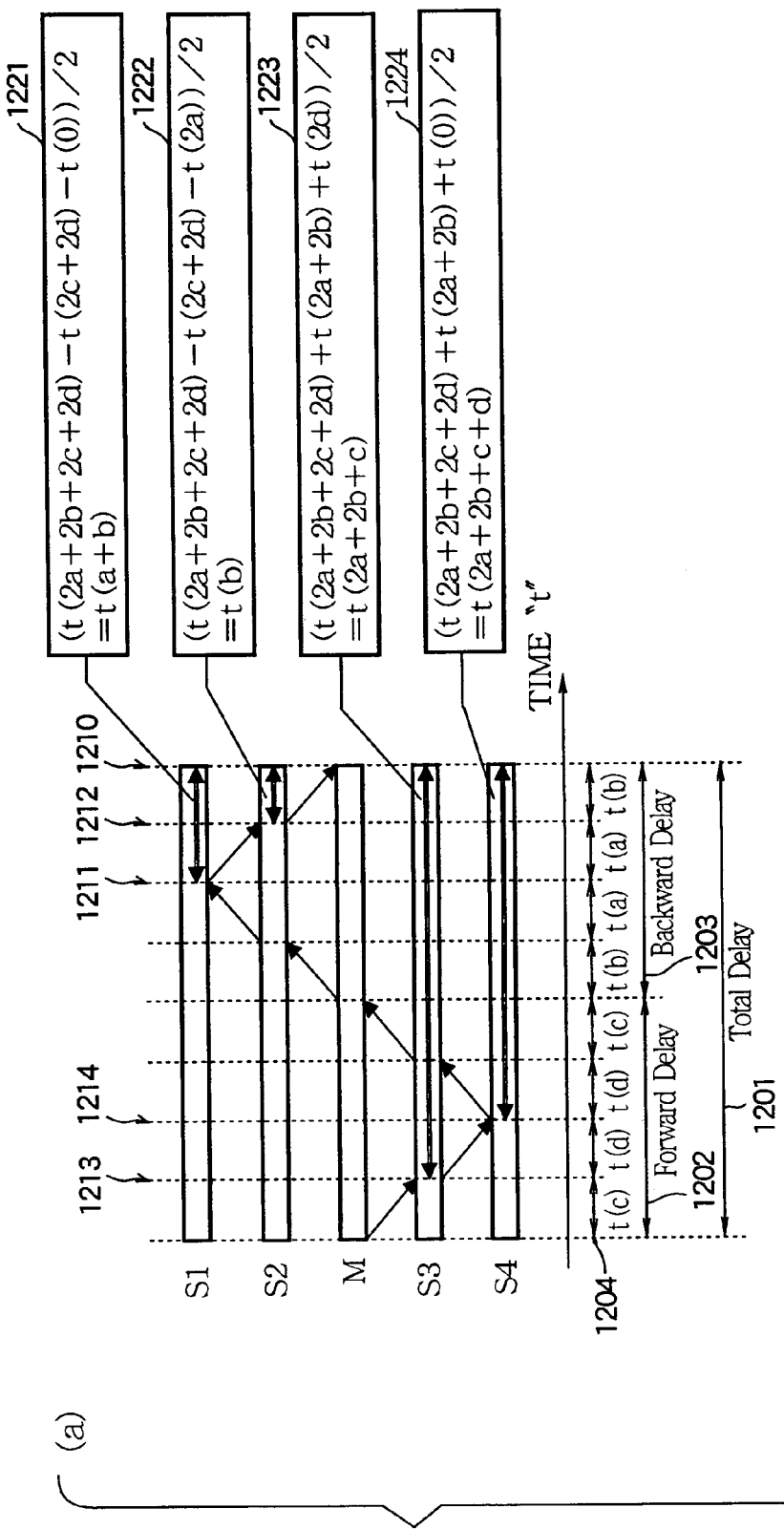

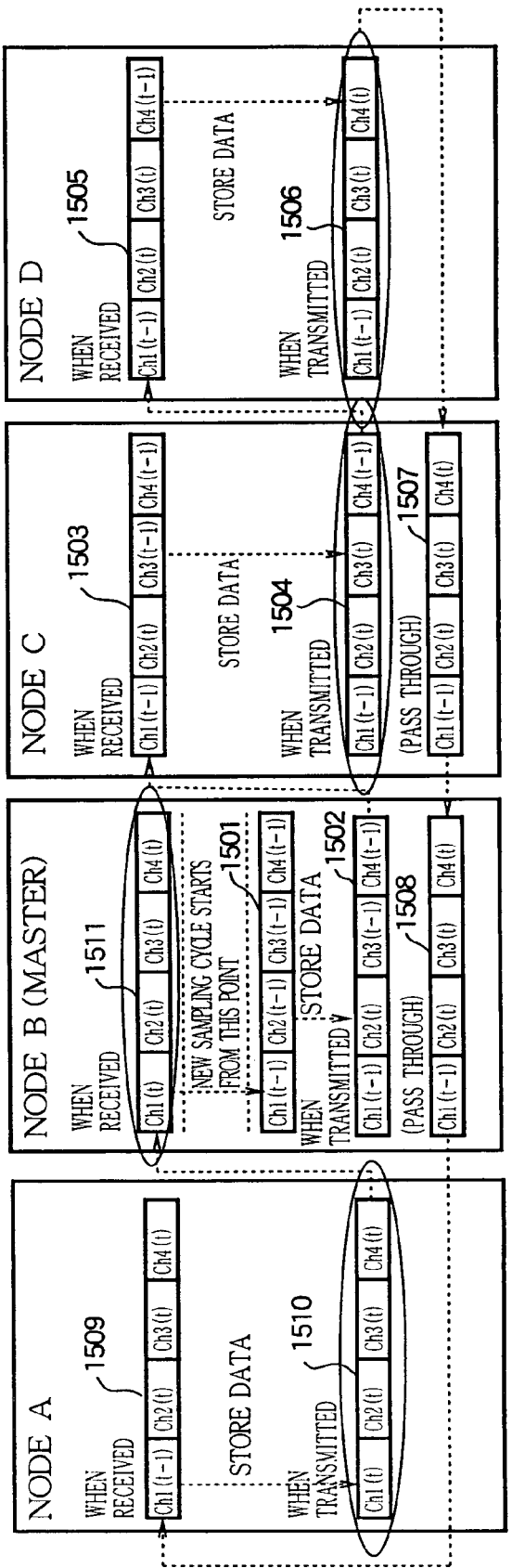

AUDIO NETWORK SYSTEM HAVING LAG CORRECTION FUNCTION OF AUDIO SAMPLES

BACKGROUND OF THE INVENTION

1. Technical Field of the Invention

The present invention relates to a lag correction technology of audio samples in which sample mismatching between nodes in a ring audio network system is corrected based on the positional relationship of the nodes.

The present invention also relates to a technology for a ring audio network system in which transmission delay times in the system are taken into consideration and the output times of audio signals from nodes are corrected, thereby correcting the phase difference of all the nodes in the system.

2. Description of the Related Art

Conventional technologies for audio signal communication in an audio network system used for PA such as plays and concerts, music production, and private broadcasting include CobraNet™ described in Non-Patent Reference 1, Super-MAC (registered trademark) described in Non-Patent Reference 2, and EtherSound (registered trademark) described in Non-Patent Reference 3. Any of them is a technology for transmitting audio signals over the Ethernet.

Conventional technologies used in a telephone line network include a ring communication network such as FDDI/TokenRing. In this scheme, a token (i.e., the right to transmit data) circulates through nodes connected in a ring so that only a node which obtains the token is permitted to transmit data.

One can consider an audio signal (audio sample data) transmission scheme using the conventional ring communication network. FIG. 13 illustrates an example of a ring audio network system. A signal circulates through nodes reciprocally along the nodes in the order of node 1301→node 1302→node 1303→node 1302→node 1301. FIG. 14 illustrates another example of the same ring audio network system. In this example, nodes 1401 to 1406 are physically connected in a ring in the named order. A packet transmitted from the master node 1401 circulates once in one sampling cycle (or time) in the order of 1401→1402→1403→1404→1405→1406. A storage region of audio sample data of a plurality of channels (Ch) is allocated in the packet and each node transmits data by loading it into a storage region of a suitable channel in the packet.

However, in the system in which data is transmitted in a ring as described above, sample data of the same sampling cycle in which corresponding sample data is stored in the circulated packet by the node 1404 is extracted from the node 1406, while sample data of a different sampling cycle is extracted from the node 1403. This is because, when the sample data stored in the node 1404 reaches the master node 1401, the sample data is incorporated into a packet that circulates in the next sampling cycle, and the node 1403 then receives the packet. By such a manner, there is caused sample time mismatching between nodes in a conventional ring audio network system. Usually, such sample mismatching causes almost no problem. However, a variety of professional audio devices may not permit such sample mismatching.

Further in the conventional system in which data is transmitted in a ring as described above, it is difficult to accurately match output timings of audio signals of all nodes of the system. Particularly, as long as the system uses transmission lines, the system suffers from delay in signal transmission through the transmission lines. Processing in each node also causes a delay. Usually, such a small delay causes almost no problem. However, a variety of professional audio devices may not permit even such a small time delay, and there may be a desire to eliminate even the phase difference of audio signals output from all nodes. For example, in order to strictly design and set up a line array speaker system, it may be necessary to take into consideration even such a small delay.

SUMMARY OF THE INVENTION

It is a first object of the present invention to provide a sample mismatching correction technology for a ring audio network system in which, when audio sample data is transmitted while circulating a packet through nodes, sample mismatching is corrected so that signals input at an absolute time are output from all the nodes in the same sampling cycle (or time), regardless of the positional relationship of the nodes.

It is a second object of the present invention to provide a delay correction technology which ensures that a ring audio network system can output audio signals without any phase difference of nodes by taking into consideration a very small delay such as a delay on a transmission line when performing transmission of audio sample data while circulating a packet through the nodes.

In order to achieve the first object, the invention provides an audio network system that connects a plurality of nodes in a ring so as to allow loop transmission of data and that performs data transmission in one direction through the ring of the nodes to perform communication between any ones of the plurality of the nodes, wherein one of the plurality of the nodes is a master node and the other nodes are slave nodes, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels, and wherein each of the nodes includes: a reading part that reads audio sample data from a particular region of the packet, which corresponds to a particular channel allocated to the node, the audio sample data being written into the particular region by another node; a storage part that stores the read audio sample data of the channel allocated to the node, wherein the storage part stores a current one of the audio sample data read in a current sampling cycle and a previous one of the audio sample data read in one sampling cycle ago; an acquiring part that acquires positional information which indicates whether said another node which writes the audio sample data of the allocated channel into the packet is located upstream or downstream of the node along a stream of the packet which is transmitted from the master node, then flows through the nodes and returns to the master node; and an output part that outputs the audio sample data of the allocated channel stored in the storage part, wherein the output part outputs the previous one of the audio sample data of the allocated channel from the storage part if said another node which writes the audio sample data of the allocated channel into the packet is located upstream of the node, and the output part outputs the current one of the audio sample data of the allocated channel from the storage part if said another node is located downstream of the node.

In an extended form, the storage part stores n+1 number of the audio sample data ranging from a current one of the audio sample data read in a current sampling cycle to previous ones of the audio sample data read in 1 through n sampling cycles ago, where "n" is an integer equal to or greater than 1. The output part outputs a previous one of the audio sample data of the allocated channel which has been stored n sampling cycles ago if said another node which writes the audio sample data of the allocated channel into the packet is located upstream of the node, and the output part outputs another previous one of the audio sample data of the allocated channel which has been stored n−1 sampling cycles ago if said another node is located downstream of the node.

In order to achieve the second object, the invention provides an audio network system that connects a plurality of nodes in a ring so as to allow loop transmission of data and that performs data transmission in one direction through the plurality of the nodes to perform communication between any ones of the plurality of the nodes, wherein one of the plurality of the nodes is a master node and the other nodes are slave nodes, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels allocated to the respective nodes for performing transmission of the audio sample data between the respective nodes, wherein each of the nodes calculates a correction time that elapses until the master node receives the packet after the node receives the packet, and wherein, when each of the nodes outputs the audio sample data of the allocated channel to an external device, the node outputs the audio sample data at an output time which is adjusted by the correction time.

In a specific form, the inventive audio network system connects a plurality of nodes in a ring so as to allow loop transmission of data and performs data transmission in one direction through the plurality of the nodes to perform communication between any ones of the plurality of the nodes, wherein one of the plurality of the nodes is a master node and the other nodes are slave nodes, wherein the ring of the nodes is constructed such that a first part of the plurality of the slave nodes are connected in chains in a forward direction so that data is transmitted from the master node in the forward direction and the first part of the plurality of the slave nodes are connected in chains in a backward direction so that the data is transmitted from a terminal slave node of the forward direction in the backward direction until the data reaches the master node after the data turns around upon reaching the terminal slave node in the forward direction, and the second part of the plurality of the slave nodes are connected in chains in a backward direction so that data is transmitted from the master node in the backward direction and the second part of the plurality of the slave nodes are connected in chains in a forward direction so that the data is transmitted from a terminal slave node of the backward direction in a forward direction until the data reaches the master node after the data turns around upon reaching the terminal slave node in the backward-direction, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels which are allocated to the respective nodes, wherein the master node includes: an acquiring part that acquires delay information including a total network delay time during which the packet circulates through the ring of the nodes and then returns to the master node, a forward-side delay time that elapses until the packet returns to the master node in the backward direction after being transmitted in the forward direction, and a backward-side delay time that elapses until the packet returns to the master node in the forward direction after being transmitted in the backward direction; and a notifying part that notifies all the slave nodes of the acquired delay information including the total network delay time, forward-side delay time, and backward-side delay time, wherein each of the slave nodes includes: a first calculating part that calculates a reception time difference between a reception time of the packet received in the forward direction and another reception time of the packet received in the backward direction; a second calculating part that calculates a correction time that elapses from a time when the node receives the packet to another time when the master node receives the packet using the notified delay information from the master node and the calculated reception time difference; a reading part that reads the audio sample data from a particular region of the packet which corresponds to the allocated channel; a storage part that stores the read audio sample data of the allocated channel; and an output part that outputs the audio sample data stored in the storage part at a proper output time which is adjusted by the correction time.

According to the first aspect of the invention, it is possible to extract data of the same sampling cycle of all channels from every node in a synchronous ring audio network, without depending on the positional relationship of nodes to which data is input and nodes from which data is output.

According to the second aspect of the invention, even in an audio network having a transmission delay, it is possible to output audio signals from respective nodes at the same time and to output in-phase audio signals from all the nodes. Thus, the invention is suitable for application to an audio system (for example, a line array speaker system) in which the phase difference between output audio signals of nodes is seriously considered.

BRIEF DESCRIPTION OF THE DRAWINGS

FIG. 11 illustrates delay times calculated by a slave node.

FIG. 12 illustrates an example of correction time calculation for each node.

FIGS. 15a and 15b illustrate an example occurrence of mismatching of samples.

DETAILED DESCRIPTION OF THE INVENTION

Embodiments of the present invention will now be described with reference to the drawings.

Figure 1:
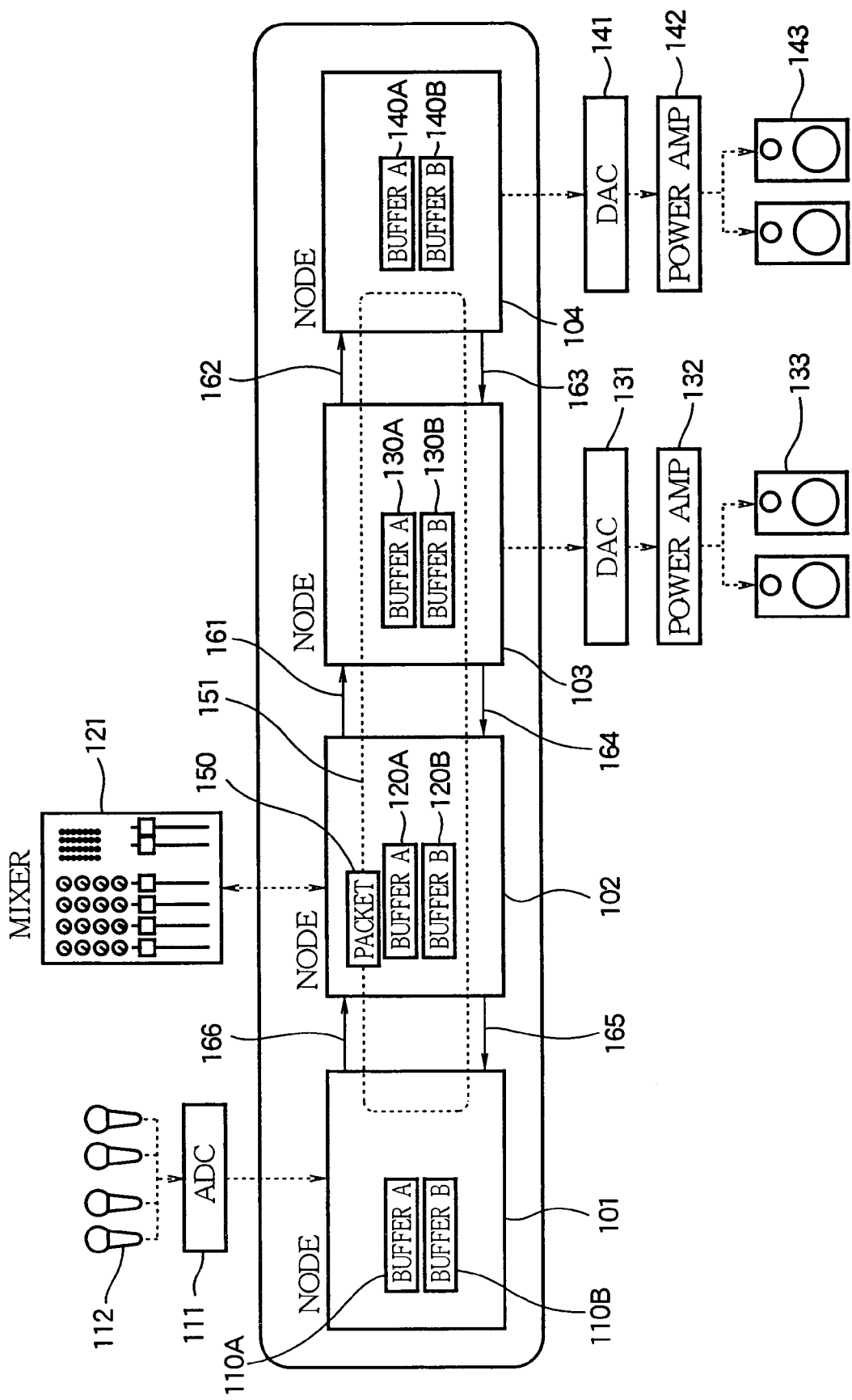
FIG. 1 is a module configuration diagram of an audio network system according to the present invention.

FIG. 1 illustrates a module configuration of an audio network system according to the invention. Reference numerals "101" to "104" denote four nodes that are connected so as to circulate a packet 150 in a ring as shown by a dotted line 151. A microphone 112 is connected to the node 101 through an analog to digital converter (ADC) 111. The node 101 can transmit audio data input through the ADC 111 to another node using a channel of the circulating packet 150. The node 102 is connected to a mixer 121. The node 102 can read audio data from a channel of the circulating packet 150 and transmit the audio data to the mixer 121. The mixer 11 performs a variety of signal processing, such as mixing, audio volume level adjustment, and effecting, on the input audio data. The mixer 121 inputs the resulting audio data of the signal processing to the node 102. The node 102 then can transmit the input audio data to another node using a channel of the circulating packet 150. The node 103 is connected to a power amplifier 132 and a speaker 133 through a digital to analog converter (DAC) 131. Similarly, the node 104 is connected to a power amplifier 142 and a speaker 143 through a DAC 141. The node 103 can read audio data from a channel of the circulating packet 150 and transmit the audio data to the power amplifier 132 through the DAC and then output its sound through the speaker 133. The same is true for the node 104.

Each of the nodes 101 to 104 includes two-stage buffers (buffer A and buffer B). Each of the buffers stores audio data that can be read by a corresponding node. The purpose of providing the two-stage buffers is to store both sample data of one sampling cycle ago and latest sample data for each channel. Most recently read data is stored in one buffer (for example, 110A) with the symbol "A" attached thereto and sample data of one sampling cycle ago is stored in another buffer (for example, 110B) with the symbol "B" attached thereto.

Figure 2:
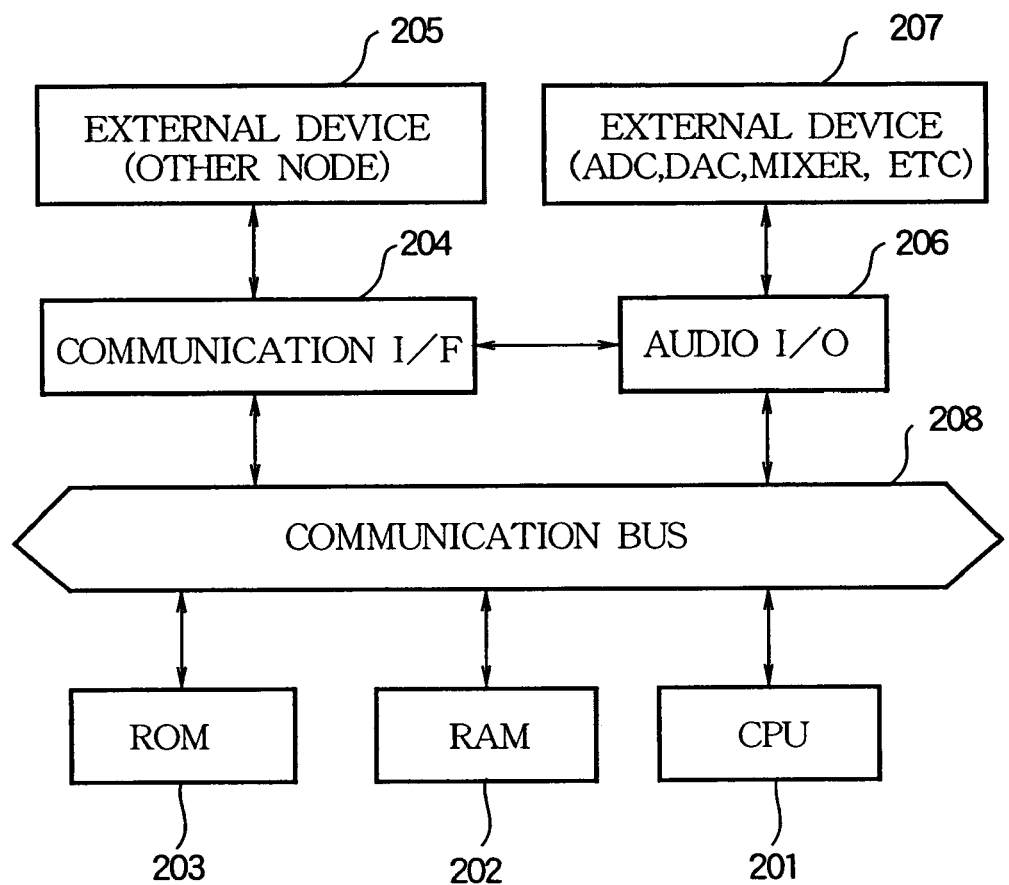
FIG. 2 is a hardware configuration diagram of each node.

FIG. 2 illustrates a hardware configuration of each node. One node includes a central processing unit (CPU) 201, a random access memory (RAM) 202, a read only memory (ROM) 203, a communication interface (I/F) 204, an audio I/O (input/output interface) 206, and a communication bus 208.

The CPU 201 is a processing unit that controls overall operations of the node. The RAM 202 is a volatile memory that is used as a loading region of programs executed by the CPU 201 or as a work region for setting a variety of buffers. The ROM 203 is a nonvolatile memory that stores a variety of programs to be executed by the CPU 201, constant number data, and the like. The communication interface 204 is connected to another node 205 that is an external device. Since, for example, the node 102 is connected to both the nodes 103 and 101 although the node 205 is illustrated as one block in FIG. 2, the node 102 includes a plurality of communication interfaces 204 for connection to the nodes 103 and 101. The audio I/O 206 is an interface for connection with an external device such as an ADC, a DAC, a mixer, or the like.

Figure 8:
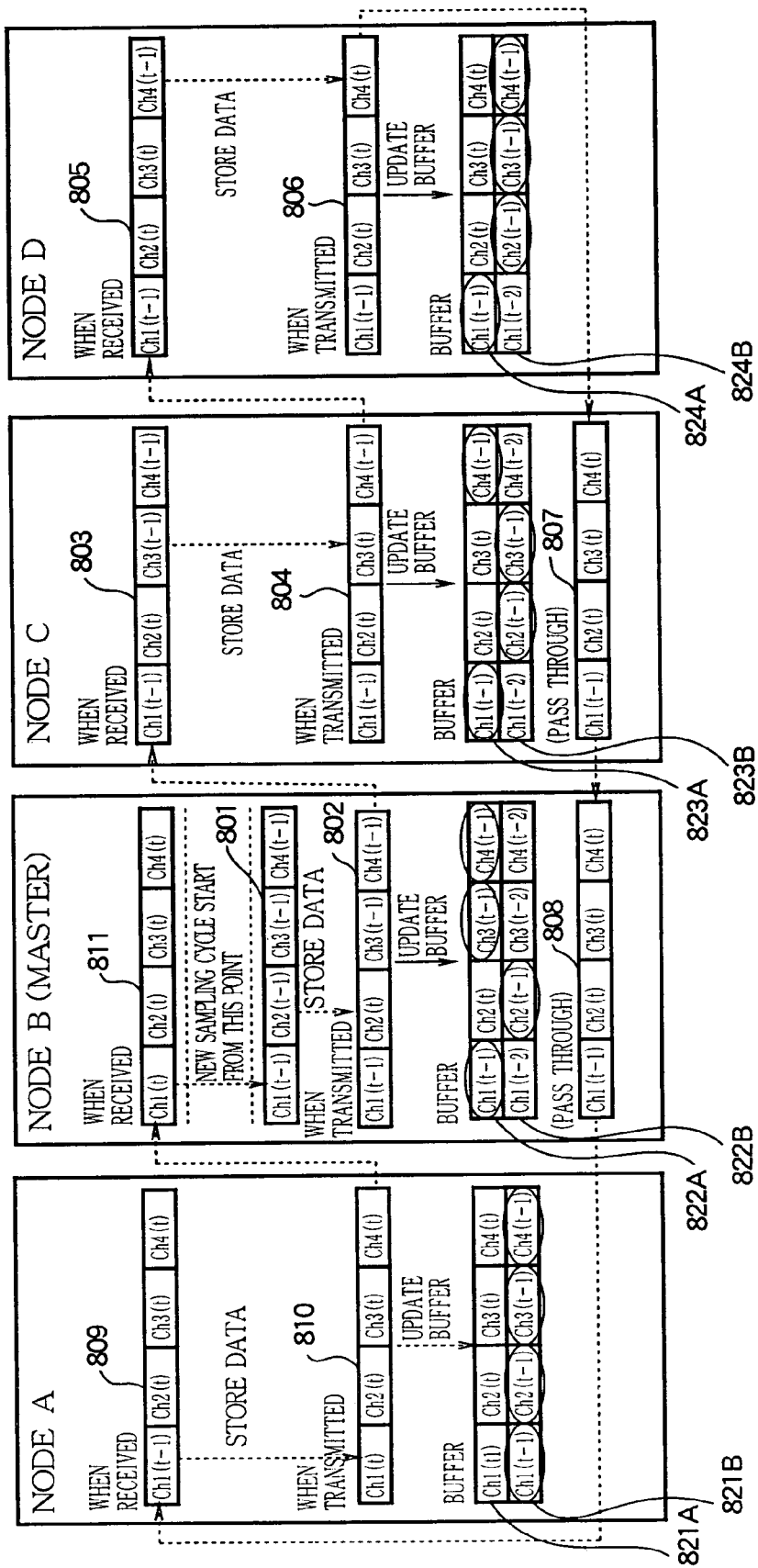
FIG. 8 illustrates a sample mismatching correction method.

A sample mismatching correction method or sampling cycle lag correction method for an audio network system of this embodiment will now be described. FIG. 8 illustrates the sample mismatching or sampling cycle lag correction method. Nodes A to D are connected in a ring allowing signals to reciprocate through the nodes. The node B is a master node. The master node B transmits a packet at the start time of one sampling cycle. Here, it is assumed that the node A stores data in a channel Ch1 of the circulating packet, the node B stores data in a channel Ch2 of the circulating packet, the node C stores data in a channel Ch3 of the circulating packet, and the node D stores data in a channel Ch4 of the circulating packet. It is also assumed that each of the nodes A to D reads data of all the channels Ch1 to Ch4. Reference numeral "801" is data which has returned to the master node B in a sampling cycle "t−1" and which contains data set in each channel in the sampling cycle "t−1". When a new sampling cycle "t" starts, the node B stores data of a cycle "t" in a Ch2 region in the packet and transmits the packet as a packet 802 to the next node C. The node C receives the packet as a packet 803 and stores data of the cycle "t" in a Ch3 region in the packet and then transmits it as a packet 804 to the next node D. The node D receives the packet as a packet 805 and stores data of the cycle "t" in a Ch4 region in the packet and then transmits it as a packet 806 to the path of a backward line. The packet only passes through the nodes C and B on the backward line without change as shown by "807" and "808". The next node A receives the packet as a packet 809 and stores data of the cycle "t" in a Ch1 region in the packet and then transmits it as a packet 810 to the next node B. The master node B receives the packet as a packet 811 and waits until the next sampling cycle starts and then performs the same processes.

Each of the nodes includes buffers A and B as illustrated in FIG. 1. For example, in the master node B, one row denoted by "822A" is a buffer A which stores latest sample data of each channel and another row denoted by "822B" is a buffer B which stores sample data of each channel of one sampling cycle ago. The same is true for other nodes. When transmitting a packet to the next node, each of the nodes A to D stores data of the channels Ch1 to Ch4 of the packet in the buffer A. Data that has been stored in the buffer until then is copied to the buffer B. The data storage in the buffer A is performed after the data copy is performed. Accordingly, each of the nodes A to D always contains a latest sample and a sample of one sampling cycle ago of each of the channels Ch1 to Ch4 in its buffers.

Each of the nodes A to D outputs sample data stored in the buffers A and B without causing mismatching of samples and, for example, delivers it to a mixer or outputs its sound through an amplifier. To prevent the sample mismatching, each node outputs data of one sampling cycle ago, which is stored in the buffer B, for channels which are subjected to writing at its upstream nodes (including a range of nodes from the master node to an immediately previous node) along the flow of data, which flows through the nodes in a ring, and outputs data of the current sampling cycle, which is stored in the buffer A, for channels which are subjected to writing at its downstream nodes (including a range of nodes from an immediately subsequent node to a node immediately prior to the master node). In the example of FIG. 8, each node outputs data of a corresponding channel in the buffer B since the node stores data for writing of the current sampling cycle in the corresponding channel and thereafter writes it together with data of the other channels in the buffer A. Of course, each node may update data of a channel for writing at the node after storing its received packet in the buffer. When the procedure is performed in this order, the node outputs the data from the buffer A. In FIG. 8, each item surrounded by an ellipse indicates a sample that each node outputs according to the rule described above. In this manner, mismatching of samples can be prevented and the samples of the cycle "t−1" can be output simultaneously.

Here, it is assumed that information of connection positions of the nodes and information about which channel is used for writing at each node are already shared among all the nodes. For example, when the system has started up, when a change has been made to the membership of nodes, or when a change has been made to channels set for writing or reading to or from a packet at each node, the nodes share this information, for example by exchanging control data with each other at the initiative of the master node.

Namely, the master node notifies all the slave nodes of control information representing at least a connecting position of each node in the audio network system and a channel allocated to each node, at the time when the audio network system starts up.

Figure 3:
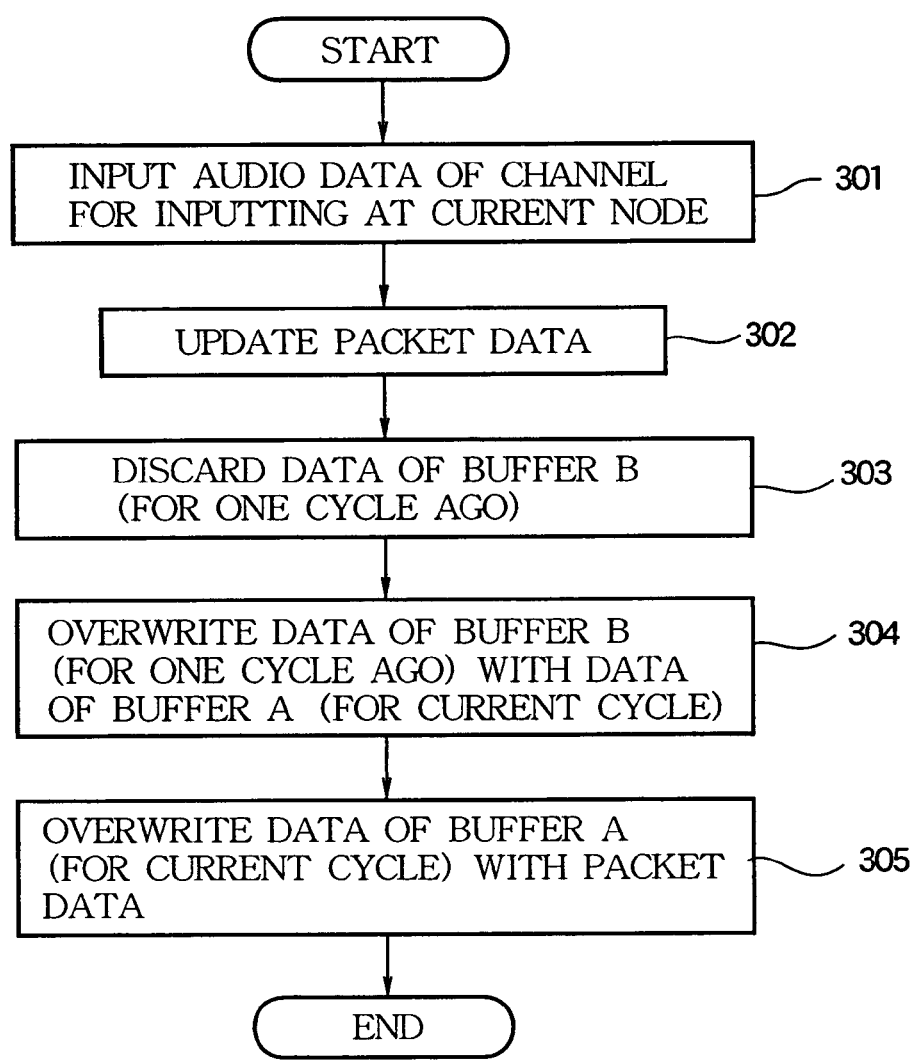
FIG. 3 is a flow chart of an audio data input routine.

FIG. 3 is a flow chart of an audio data input routine that each of the nodes performs upon receiving a packet circulating through the nodes. At step 301, audio data of a channel for inputting at the node is input to the node. In this process, for example, an audio signal from the microphone 112 is input to the node 101 of FIG. 1 through the ADC 111 or a digital audio signal output from the mixer 121 is input to the node 102. At step 302, data of the channel in the received packet is updated by overwriting the data of the channel with the latest sample input at step 301. At step 303, the node discards data of the channel in the buffer B in which samples of one sampling cycle ago have been stored. At step 304, the data of the channel of the buffer B is overwritten with data of the channel of the buffer A in which samples of the current sampling cycle are stored. At step 305, data of the channel of the buffer A is overwritten with data of the channel of the packet. When data of a plurality of channels is input, the node repeats the above procedure. The data discarding at step 303 is automatically performed by the overwriting at step 304.

As described above, the node 101 is connected to a microphone 112 through an analog-to-digital converter 111 such that the analog-to-digital converter 111 converts an audio signal fed from the microphone 112 into audio sample data, and the node 101 writes the audio sample data fed from the analog-to-digital converter 111 into a region of a packet 150 so as to transmit the audio sample data to another node 102.

Figure 4:
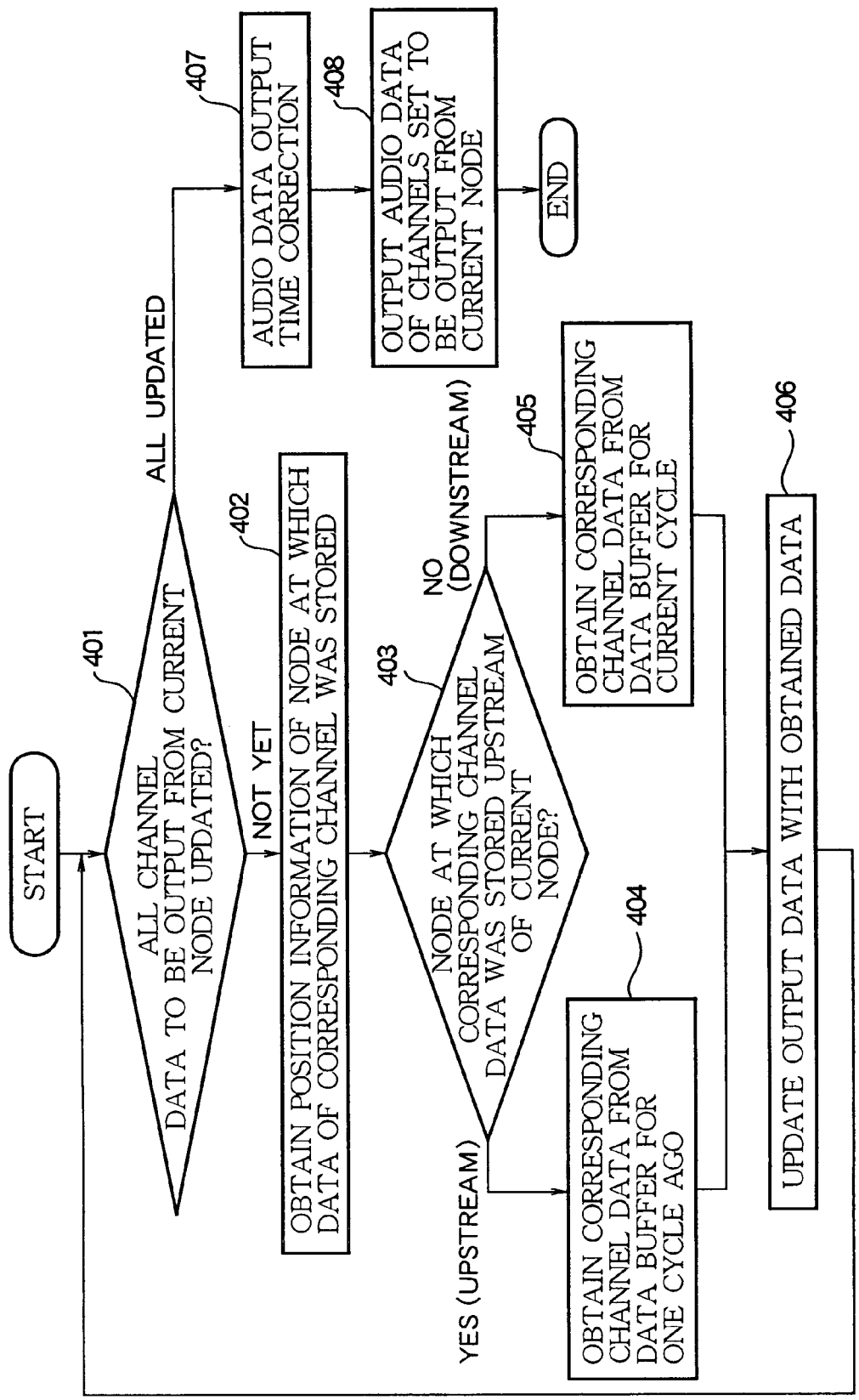
FIG. 4 is a flow chart of an audio data output routine.

FIG. 4 is a flow chart of an audio data output routine in which each node outputs sample data read into a buffer to an external device. In this procedure, for example, the node 102 of FIG. 1 outputs sample data to the mixer 121 or the node 103 or 104 outputs its sound through the DAC and the amplifier. At step 401, the node determines whether or not output data of all channels, which will be output from the node, have been updated. This process is to determine whether or not all sample data of channels to be output has been gathered at a specific work area (for output data). If all the data has not yet been updated, the node (i.e., the current node) obtains, at step 402, position information of a corresponding node at which a sample of the corresponding channel was stored. At step 403, the current node determines whether the corresponding node is its upstream node (i.e., one in the range from the master node to its immediately previous node) or its downstream node (i.e., one in the range from its immediately subsequent node to a node immediately prior to the master node). If the corresponding node is an upstream node, the current node obtains sample data of the corresponding channel from the buffer B for one cycle ago at step 404. If the corresponding node is a downstream node, the current node obtains sample data of the corresponding channel from the buffer A for the current cycle at step 405. Then, the node updates the output data with the obtained data at step 406 and returns to step 401. If the sample data of all channels to be output is gathered together as output data, the node proceeds from step 401 to step 407 and performs an audio data output time correction process which will be described later. Then, at step 408, the node outputs audio data of channels, which is set to be output from the node, to a specified external device.

As described above, one node 102 is connected to a mixer 121. The node 102 outputs the audio sample data of the allocated channel to the mixer 121 so that the mixer 121 applies a predetermined signal process to the audio sample data transmitted from the node 102 and feeds audio sample data applied with the predetermined signal process. The node 102 includes an updating part that writes the audio sample data fed from the mixer 121 a region of a packet 150 so as to transmit the audio sample data to another node 103.

The node 103 is connected to an amplifier 132 of a speaker 133 through a digital-to-analog converter 131. The node 103 outputs the audio sample data of the allocated channel to the digital-to-analog converter 131 so that the digital-to-analog converter 131 converts the outputted audio sample data to an analog audio signal, and the amplifier 132 amplifies the analog audio signal for driving the speaker 133.

In the above manner, each node performs the sampling cycle lag correction described with reference to FIG. 8 and simultaneously outputs samples of the same sampling cycle.

Although 2-stage buffers are provided in FIG. 8, (n+1)-stage buffers may be provided, where "n" is an integer equal to or greater than 1. In this case, n+1 audio sample data including a range of samples from samples read in the current sampling cycle to samples read in n sampling cycles ago are stored. When a sample in a packet is to be output from the current node which has received the packet, the current node may read and output a corresponding sample of n sampling cycles ago if a corresponding node which incorporated the sample into the packet is upstream of the current node and may read and output a corresponding sample of n−1 sampling cycles ago if the corresponding node is downstream of the current node.

The audio data output time correction process of step 407 will now be described in detail. The above sample deviation correction can match output timings on a sample basis. However, each transmission path between nodes on the ring network causes a delay since sample data of each channel is transmitted by incorporating the data into a packet that circulates through the ring network. Although this delay may be very small and thus be negligible, even such a small delay may not be permitted in professional audio devices. The audio data output time correction process is performed to correct the delay due to the transmission path, thereby very accurately matching the output timings of audio signals from the node.

Figure 9:
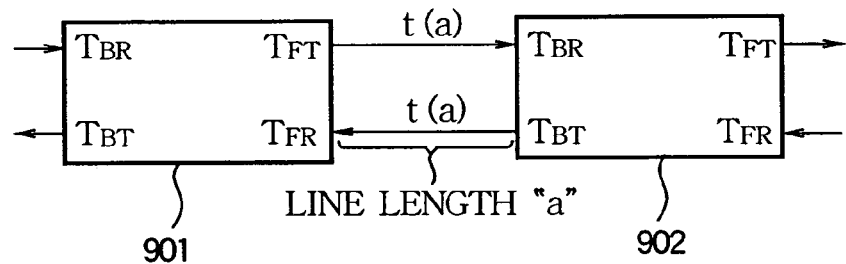
FIG. 9 illustrates the definitions of delay and transmission/reception times.
Figure 13:
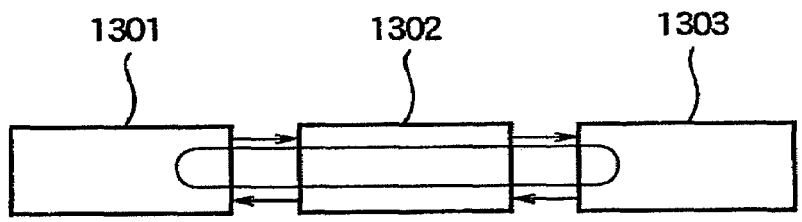
FIG. 13 illustrates an example of a ring audio network system.
Figure 14:
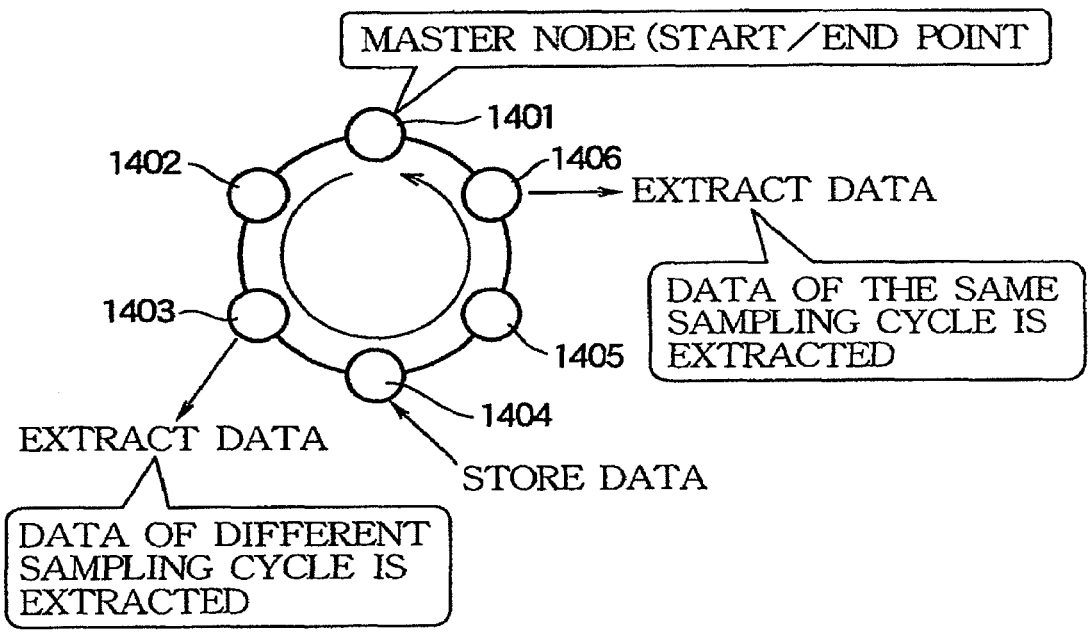
FIG. 14 illustrates another example of the ring audio network system.

The following is a detailed description of the audio data output time correction process. The following description will be given with reference to a network having a connection structure allowing signals to reciprocate through the network as shown in FIG. 13. It is also assumed that each node performs writing and reading of data to and from a packet on a forward path and the packet only passes through each node on a backward path. In the following description, "t(a)" denotes a delay time for a line length "a", "$T_{FT}$" and "$T_{FR}$" denote forward-side transmission/reception times of each of the nodes 901 and 902, and "$T_{BT}$" and "$T_{BR}$" denote backward-side transmission/reception times as shown in FIG. 9. In addition, "Total Delay" denotes a total delay time of the network, "Forward Delay" and "Backward Delay" denotes delay times of the forward and backward sides of the master node, and "Node (Name) Delay" denotes the difference between packet reception times of each node. That is, "Total Delay" is a delay time corresponding to a period of time during which the packet circulates through the network once. "Forward Delay" is a delay time corresponding to the time that elapses until the master node receives data at its forward side after the data is transmitted from the master node at its forward side. "Backward Delay" is a delay time corresponding to the time that elapses until the master node receives data at its backward side after the data is transmitted from the master node at its backward side.

The term "forward side" refers to one side of the master node at which the master node starts transmitting a packet at the start of a sampling cycle and the term "backward side" refers to the opposite side. In FIG. 9, the right side is the forward side and the left side is the backward side. The same is true for FIGS. 10 and 11.

Figure 10A:
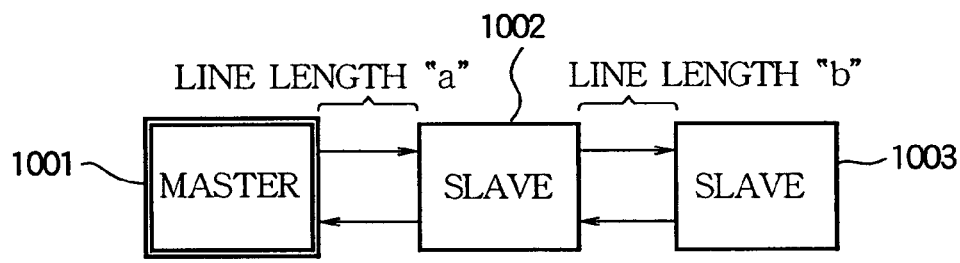
FIGS. 10a, 10b and 10c illustrate delay times calculated by a master node.
Figure 10B:
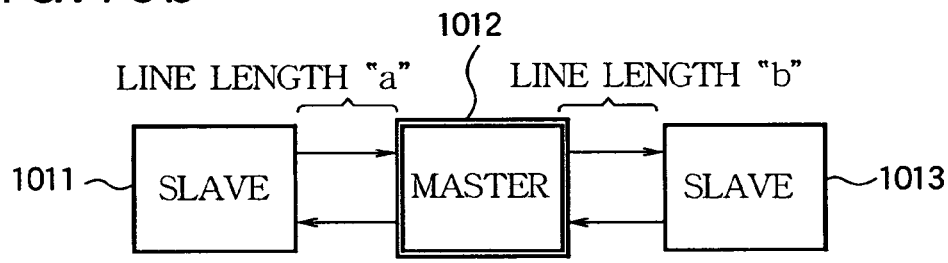
Figure 10C:
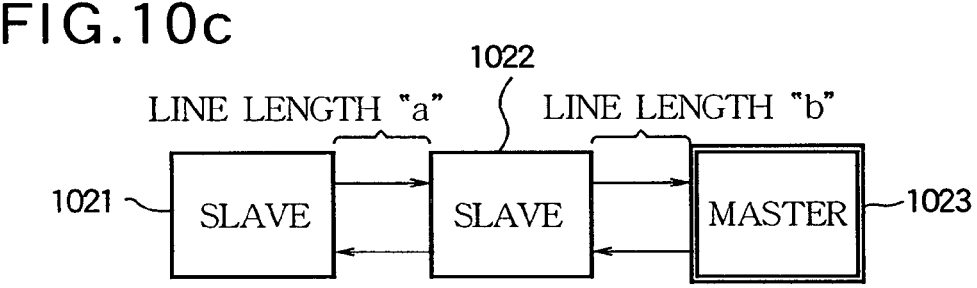

FIGS. 10a to 10c illustrate delay times calculated by a master node. FIG. 10a illustrates an example where a master node 1001 is disposed at a backward end of a network and a backward-side output of the master node 1001 is connected directly to a backward-side input thereof inside the master node 1001. FIG. 10b illustrates an example where a master node 1012 is connected between slave nodes 1011 and 1013 and the slave nodes 1011 and 1013 are connected respectively to a backward-side input and output and a forward-side input and output of the master node 1012. FIG. 10c illustrates an example where a master node 1023 is disposed at a forward end of a network and a forward-side output of the master node 1023 is connected directly to a forward-side input thereof inside the master node 1023. The respective delay times "Total Delay", "Forward Delay", and "Backward Delay" of the examples are calculated as illustrated in FIGS. 10a to 10c. Although the delay time calculation is exemplified by three nodes in these examples, the delay times are calculated in the same manner also when a larger number of nodes are connected.

As described above, the master node determines the total network delay time, the forward-side delay time, and the backward-side delay time according to a length of lines "a" and "b" for connecting the nodes. The master node may determine either of the forward-side delay time and the backward-side delay time to be zero in case that either of the first part or the second part of the plurality of the slave nodes is not connected to the master node as depicted in FIGS. 10a and 10c.

FIGS. 11a to 11f illustrate delay times calculated by slave nodes. Each slave node calculates, as a delay time, the difference between packet data reception times of the forward and backward sides of the slave node. This delay time is calculated using different calculation methods depending on the positional relationship with the master node. For example, slave nodes 1102 and 1103 (entitled "S3" and "S4") which are located on the forward side of the master node 1101 calculate the delay time as "$T_{FR}-T_{BR}$" as shown in FIGS. 11d and 11e. On the other hand, slave nodes 1104 and 1105 (entitled "S1" and "S2") which are located on the backward side of the master node 1101 calculate the delay time as "$T_{BR}-T_{FR}$" as shown in FIGS. 11b and 11c. In the connection example of FIG. 11a, the master node 1101 calculates delay times as shown in FIG. 11f.

As described above, the terminal slave nodes S1 and S4 calculate their reception time difference to be zero as depicted in FIGS. 11b and 11e.

FIGS. 12a to 12c illustrate examples of calculation of a correction time for each node, which is the time by which the node delays the output time of sample data when outputting the sample data to an external device such as a mixer or an amplifier. The horizontal axis of FIG. 12a represents elapsed time and symbols "S1", "S2", "M", "S3", and "S4" arranged along the vertical axis represent the master and slave nodes of FIG. 11a. Arrows in "M→S3→S4→S3→M→S2→S1→S2→M" FIG. 12a indicate that packet data circulates through the nodes along the arrows in the network structure of FIG. 11a, where the right-down arrows indicate a forward path and the left-down arrows indicate a backward path. "1024" denotes delay times between the nodes when packet data circulates along the arrows. "1201" denotes the total delay, "1202" denotes the forward delay, and "1203" denotes the backward delay.

Reference numeral "1213" in FIG. 12a denotes the timing when the slave node S3 receives a packet transmitted from the master node M. Upon receiving the packet, the node S3 performs the above procedure of FIG. 4. Similarly, the node S4 performs the procedure of FIG. 4 at timing 1214, the node S1 performs the procedure at timing 1211, and the node S2 performs the procedure at timing 1212. If the nodes do not perform the output time correction of step 407 in the procedure of FIG. 4, the nodes output audio data at different timings since the node S3 outputs audio data at the timing 1213, the node S4 outputs audio data at the timing 1214, and so on. Accordingly, in this embodiment, the timings 1213, 1214, 1211, and 1212 of the nodes are delayed until the timing 1210. The timing 1210 is the timing when the packet returns to the master node. If they wait until the timing 1210, all the nodes gather together samples of the same sampling cycle. By simultaneously outputting the samples, it is possible to very accurately match the output timings of audio signals from the nodes. The delay time of each node until the timing 1210 is reached after it receives the packet is referred to as a correction time. In FIG. 12a, "1221" to "1224" indicate respective correction time calculation methods of the nodes.

FIG. 12b illustrates a correction time calculation method for the forward-side slave nodes. The forward-side slave nodes are for example the nodes S3 and S4. The correction time of each of the nodes S3 and S4 can be basically calculated as the time that elapses until a packet returns to the master node after the packet is input to the node through its backward-side input ($T_{BR}$) so that it can be calculated as "Total Delay-{(Total Delay)-(Backward Delay)-(Node (Name) Delay)}/2". This expression can be rearranged to obtain an expression of FIG. 12b. Equations 1223 and 1224 are obtained by substituting the equations of FIG. 11f into the expression of FIG. 12b.

FIG. 12c illustrates a correction time calculation method for the backward-side slave nodes. The backward-side slave nodes are for example the nodes S1 and S2. The correction time of each of the nodes S1 and S2 can also be basically calculated as the time that elapses until a packet returns to the master node after the packet is input to the node through its backward-side input ($T_{BR}$) so that it can be calculated as "{(Total Delay)-(Forward Delay)-(Node (Name) Delay)}/2". This expression can be rearranged to obtain an expression of FIG. 12c. Equations 1221 and 1222 are obtained by substituting the equations of FIG. 11f into the expression of FIG. 12c.

Figure 5:
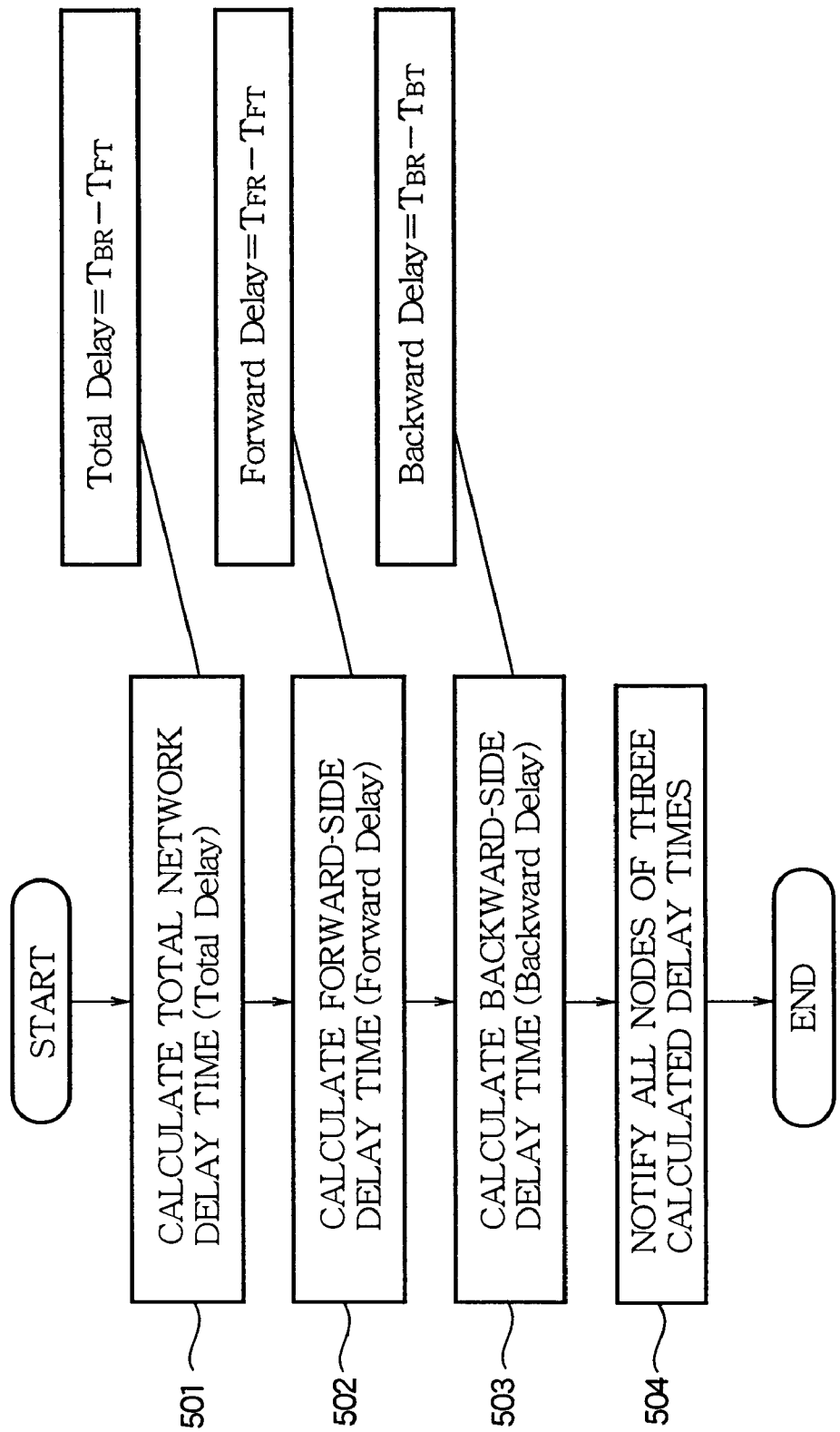
FIG. 5 is a flow chart of a delay time calculation routine for a master node.

FIG. 5 is a flow chart of a delay time calculation routine for a master node. At step 501, the master node calculates a total delay time (Total Delay) of the network. At step 502, the master node calculates a forward-side delay time (Forward Delay). At step 503, the master node calculates a backward-side delay time (Backward Delay). At step 504, the master node notifies all nodes of the calculation information. Through this procedure, the master node calculates each delay time described above with reference to FIG. 10.

Figure 6:
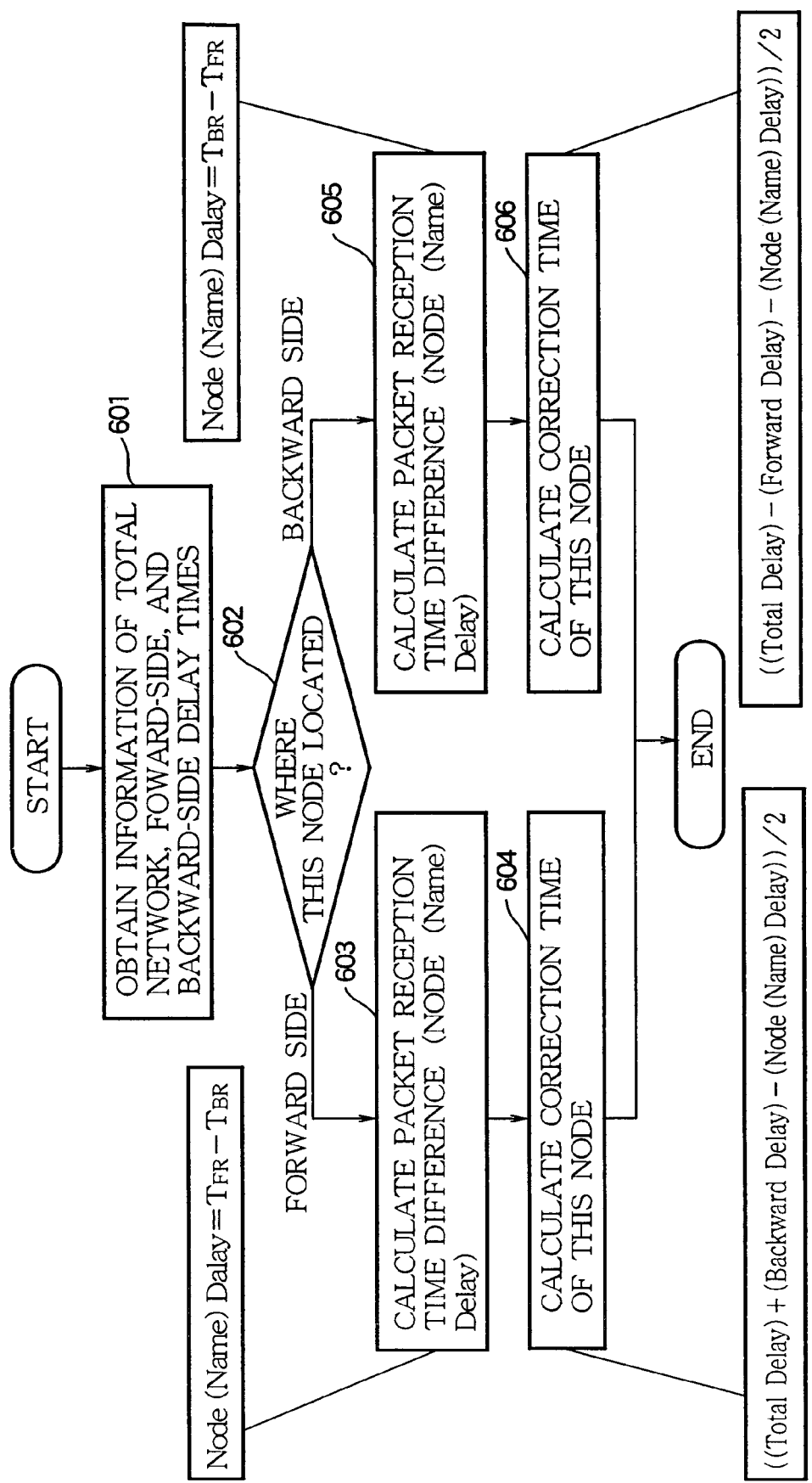
FIG. 6 is a flow chart of a delay time calculation routine for a slave node.

FIG. 6 is a flow chart of a delay time calculation routine for each slave node. At step 601, each slave node obtains total network, forward-side, and backward-side delay time information (Total Delay, Forward Delay, and Backward Delay). At step 602, the node determines whether it is located on the forward side or the backward side. If it is located on the forward side, the node obtains its packet time reception difference at step 603 and calculates a correction time using the mathematical expression of FIG. 12b at step 604. If it is located on the backward side, the node obtains its packet time reception difference at step 605 and calculates a correction time using the mathematical expression of FIG. 12*c* at step 606.

Through the procedures of FIGS. 5 and 6, the nodes can calculate their delay times described above with reference to FIGS. 10 and 11. Before audio data transmission is initiated, the slave nodes perform the procedures of FIGS. 5 and 6 and calculate their correction times.

Figure 7:
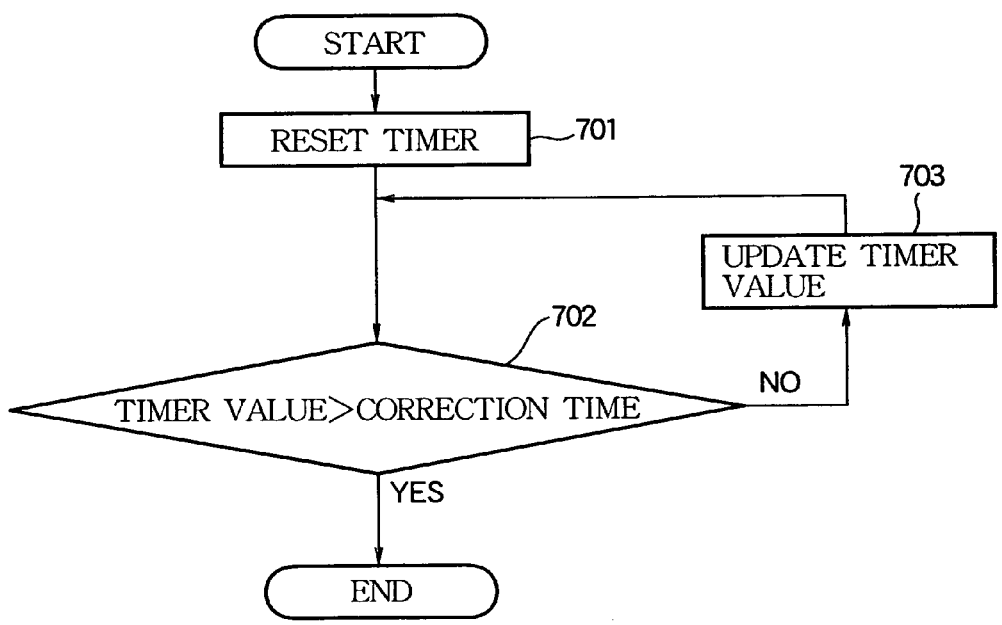
FIG. 7 is a flow chart of an audio data output routine for a slave node.

FIG. 7 is a flow chart of an audio data output routine for a slave node. The node performs this procedure at step 407 of FIG. 4. The node resets a timer at step 701 and waits, at steps 702 and 703, until the timer value exceeds the correction time which the node has calculated at step 604 or 606. If the timer value has exceeded the correction time, the node returns to the procedure of FIG. 4. Thereafter, the node outputs audio data at step 408 of FIG. 4. In this manner, each node outputs audio data by delaying it by a correction time for the node as described above with reference to FIG. 12, thereby matching the output timings of all the nodes.

While the above embodiments have been exemplified by the audio network system having the connection relationship as shown in FIG. 13, the invention can be applied to any audio network system which connects a plurality of nodes in a ring to circulate a packet through the nodes. In this case, each node obtains the time that elapses from when the node receives a packet to when the master node receives the packet and determines it to be a correction time. For example, when the system starts up, it may circulate a correction time measurement packet so that each node obtains, as a correction time, the time that elapses from a time when the node receives a packet to another time when the master node receives the packet.

Lastly, the following is a detailed mechanism of time lags of samples created among the nodes. This description is simply intended to facilitate better evaluation of the invention. FIG. 15*b* illustrates a ring audio network system in which nodes A to D are connected in such a manner that a signal reciprocates along the nodes as shown in FIG. 13. The node B is a master node. The master node B transmits a packet at the start time of one sampling cycle.

Here, it is assumed that, as shown in FIG. 15*a*, the node A stores data in a channel Ch1 of the circulating packet, the node B stores data in a channel Ch2 of the circulating packet, the node C stores data in a channel Ch3 of the circulating packet, and the node D stores data in a channel Ch4 of the circulating packet. It is also assumed that each of the nodes A to D reads data of all the channels Ch1 to Ch4. Reference numeral "1501" is data which has returned to the master node B in a sampling cycle "t−1" and which contains data set in each channel in the sampling cycle "t−1". When a hew sampling cycle "t" starts, the node B stores data of a cycle "t" in a Ch2 region in the packet and transmits the packet as a packet 1502 to the next node C. The node C receives the packet as a packet 1503 and stores data of the cycle "t" in a Ch3 region in the packet and then transmits it as a packet 1504 to the next node D. The node D receives the packet as a packet 1505 and stores data of the cycle "t" in a Ch4 region in the packet and then transmits it as a packet 1506 to the path of a backward line. The packet only passes through the nodes C and B on the backward line without change as shown by "1507" and "1508". The next node A receives the packet as a packet 1509 and stores data of the cycle "t" in a Ch1 region in the packet and then transmits it as a packet 1510 to the next node B. The master node B receives the packet as a packet 1511 and waits until the next sampling cycle starts and then performs the same processes.

While the packet circulates in the above manner, the nodes A to D read data of the channels Ch1 to Ch4 of the packets 1510, 1511, 1504, and 1506 surrounded by ellipses, respectively. In this case, while the master node A and its immediately previous node B obtain samples of the cycle "t", sample mismatching occurs in the nodes C and D. That is, each of the nodes C and D reads a mix of samples of the cycle "t−1" and samples of the cycle "t". The sample mismatching occurs for the following reason. In the case where a packet circulates through nodes on a network, starting from a master node, once in a sampling cycle, data stored in a node in a sampling cycle "t" may be extracted from one different node in the sampling cycle "t" while it may be extracted from another different node in the next sampling cycle, depending on the arrangement of the nodes on the network (i.e., depending on the positional relationship of nodes in which data is stored and nodes from which data is extracted).

The invention claimed is:

1. An audio network system that connects a plurality of nodes in a ring so as to allow loop transmission of data and that performs data transmission in one direction through the ring of the nodes to perform communication between any ones of the plurality of the nodes, wherein one of the plurality of the nodes is a master node and the other nodes are slave nodes, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels, wherein information of connection positions of the nodes and information about which channel is set for writing of data at each node are shared among all the nodes, and wherein each of the nodes includes:

a reading part that reads audio sample data from a particular region of the packet, which corresponds to a particular channel allocated to the node, the audio sample data being written into the particular region by another node;

a storage part that stores the read audio sample data of the channel allocated to the node, wherein the storage part stores a current one of the audio sample data read in a current sampling cycle and a previous one of the audio sample data read in one sampling cycle ago;

an acquiring part that acquires positional information which indicates whether said another node which writes the audio sample data of the allocated channel into the packet is located upstream or downstream of the node along a stream of the packet which is transmitted from the master node, then flows through the nodes and returns to the master node; and an output part that outputs the audio sample data of the allocated channel stored in the storage part, wherein the output part outputs the previous one of the audio sample data of the allocated channel from the storage part if said another node which writes the audio sample data of the allocated channel into the packet is located upstream of the node, and the output part outputs the current one of the audio sample data of the allocated channel from the storage part if said another node is located downstream of the node.

2. The audio network system according to claim 1, wherein at least one node is connected to a mixer, wherein the output part of the one node outputs the audio sample data of the allocated channel to the mixer so that the mixer applies a predetermined signal process to the audio sample data transmitted from the one node and feeds audio sample data applied with the predetermined signal process, and wherein the one node includes an updating part that writes the audio sample data fed from the mixer a region of a packet so as to transmit the audio sample data to another node.

3. The audio network system according to claim 1, wherein at least one node is connected to an amplifier of a speaker through a digital-to-analog converter, and wherein the output part of the one node outputs the audio sample data of the allocated channel to the digital-to-analog converter so that the digital-to-analog converter converts the outputted audio sample data to an analog audio signal, and the amplifier amplifies the analog audio signal for driving the speaker.

4. The audio network system according to claim 1, wherein at least one node is connected to a microphone through an analog-to-digital converter such that the analog-to-digital converter converts an audio signal fed from the microphone into audio sample data, and wherein the one node includes an updating part that writes the audio sample data fed from the analog-to-digital converter into a region of a packet so as to transmit the audio sample data to another node.

5. An audio network system that connects a plurality of nodes in a ring so as to allow loop transmission of data and that performs data transmission in one direction through the ring of the nodes to perform communication between any ones of the plurality of the nodes, wherein one of the plurality of the nodes is a master node and the other nodes are slave nodes, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels, wherein information of connection positions of the nodes and information about which channel is set for writing of data at each node are shared among all the nodes, and wherein each of the nodes includes:

a reading part that reads audio sample data from a particular region of the packet, which corresponds to a particular channel allocated to the node, the audio sample data being written into the particular region by another node;

a storage part that stores the read audio sample data of the channel allocated to the node, wherein the storage part stores n+1 number of the audio sample data ranging from a current one of the audio sample data read in a current sampling cycle to previous ones of the audio sample data read in 1 through n sampling cycles ago, where "n" is an integer equal to or greater than 1;

an acquiring part that acquires positional information which indicates whether said another node which writes the audio sample data of the allocated channel into the packet is located upstream or downstream of the node along a stream of the packet which is transmitted from the master node, then flows through the nodes and returns to the master node; and an output part that outputs the audio sample data of the allocated channel stored in the storage part, wherein the output part outputs a previous one of the audio sample data of the allocated channel which has been stored n sampling cycles ago if said another node which writes the audio sample data of the allocated channel into the packet is located upstream of the node, and the output part outputs another previous one of the audio sample data of the allocated channel which has been stored n−1 sampling cycles ago if said another node is located downstream of the node.

6. The audio network system according to claim 5, wherein at least one node is connected to a mixer, wherein the output part of the one node outputs the audio sample data of the allocated channel to the mixer so that the mixer applies a predetermined signal process to the audio sample data transmitted from the one node and feeds audio sample data applied with the predetermined signal process, and wherein the one node includes an updating part that writes the audio sample data fed from the mixer a region of a packet so as to transmit the audio sample data to another node.

7. The audio network system according to claim 5, wherein at least one node is connected to an amplifier of a speaker through a digital-to-analog converter, and wherein the output part of the one node outputs the audio sample data of the allocated channel to the digital-to-analog converter so that the digital-to-analog converter converts the outputted audio sample data to an analog audio signal, and the amplifier amplifies the analog audio signal for driving the speaker.

8. The audio network system according to claim 5, wherein at least one node is connected to a microphone through an analog-to-digital converter such that the analog-to-digital converter converts an audio signal fed from the microphone into audio sample data, and wherein the one node includes an updating part that writes the audio sample data fed from the analog-to-digital converter into a region of a packet so as to transmit the audio sample data to another node.

9. An audio network system that connects a plurality of nodes in a ring so as to allow loop transmission of data and that performs data transmission in one direction through the plurality of the nodes to perform communication between any ones of the plurality of the nodes, wherein one of the plurality of the nodes is a master node and the other nodes are slave nodes, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels allocated to the respective nodes for performing transmission of the audio sample data between the respective nodes, wherein information of connection positions of the nodes and information about which channel is set for writing of data at each node are shared among all the nodes, wherein each of the nodes calculates a correction time that elapses until the master node receives the packet after the node receives the packet, and wherein, when each of the nodes outputs the audio sample data of the allocated channel to an external device, the node outputs the audio sample data at an output time which is adjusted by the correction time.

10. An audio network system that connects a plurality of nodes in a ring so as to allow loop transmission of data and that performs data transmission in one direction through the plurality of the nodes to perform communication between any ones of the plurality of the nodes, wherein one of the plurality of the nodes is a master node and the other nodes are slave nodes, wherein the ring of the nodes is constructed such that a first part of the plurality of the slave nodes are connected in chains in a forward direction so that data is transmitted from the master node in the forward direction and the first part of the plurality of the slave nodes are connected in chains in a backward direction so that the data is transmitted from a terminal slave node of the forward direction in the backward direction until the data reaches the master node after the data turns around upon reaching the terminal slave node in the forward direction, and a second part of the plurality of the slave nodes are connected in chains in a backward direction so that data is transmitted from the master node in the backward direction and the second part of the plurality of the slave nodes are connected in chains in a forward direction so that the data is transmitted from a terminal slave node of the backward direction in a forward direction until the data reaches the master node after the data turns around upon reaching the terminal slave node in the backward direction, wherein the master node transmits a packet of frame data regularly every sampling cycle, such that the packet circulates through the plurality of the nodes connected in the ring during the sampling cycle, wherein the packet is provided with a plurality of regions for containing audio sample data in correspondence to a plurality of channels which are allocated to the respective nodes, wherein the master node includes:

an acquiring part that acquires delay information including a total network delay time during which the packet circulates through the ring of the nodes and then returns to the master node, a forward-side delay time that elapses until the packet returns to the master node in the backward direction after being transmitted in the forward direction, and a backward-side delay time that elapses until the packet returns to the master node in the forward direction after being transmitted in the backward direction; and a notifying part that notifies all the slave nodes of the acquired delay information including the total network delay time, forward-side delay time, and backward-side delay time, wherein each of the slave nodes includes:

a first calculating part that calculates a reception time difference between a reception time of the packet received in the forward direction and another reception time of the packet received in the backward direction;

a second calculating part that calculates a correction time that elapses from a time when the node receives the packet to another time when the master node receives the packet using the notified delay information from the master node and the calculated reception time difference;

a reading part that reads the audio sample data from a particular region of the packet which corresponds to the allocated channel;

a storage part that stores the read audio sample data of the allocated channel; and an output part that outputs the audio sample data stored in the storage part at a proper output time which is adjusted by the correction time.

11. The audio network system according to claim 10, wherein the acquiring part of the master node determines the total network delay time, the forward-side delay time, and the backward-side delay time according to a length of lines for connecting the nodes.

12. The audio network system according to claim 11, wherein the acquiring part of the master node determines either of the forward-side delay time and the backward-side delay time to be zero in case that either of the first part or the second part of the plurality of the slave nodes is not connected to the master node.

13. The audio network system according to claim 10, wherein the first calculating part of the terminal slave node calculates the reception time difference to be zero.

14. The audio network system according to claim 10, wherein the notifying part of the master node notifies all the slave nodes of control information representing at least a connecting position of each node in the audio network system and a channel allocated to each node, at the time when the audio network system starts up.

* * * * *